United States Patent
Makio et al.

(10) Patent No.: US 11,951,843 B2
(45) Date of Patent: *Apr. 9, 2024

(54) POWER SUPPLY DEVICE FOR VEHICLE

(71) Applicant: IMASEN ELECTRIC INDUSTRIAL CO., LTD., Aichi (JP)

(72) Inventors: Daisuke Makio, Aichi (JP); Koichi Yamanoue, Aichi (JP)

(73) Assignee: IMASEN ELECTRIC INDUSTRIAL CO., LTD., Aichi (JP)

( * ) Notice: Subject to any disclaimer, the term of this patent is extended or adjusted under 35 U.S.C. 154(b) by 51 days.

This patent is subject to a terminal disclaimer.

(21) Appl. No.: 17/756,344

(22) PCT Filed: Dec. 7, 2020

(86) PCT No.: PCT/JP2020/045459
§ 371 (c)(1),
(2) Date: May 23, 2022

(87) PCT Pub. No.: WO2021/149371
PCT Pub. Date: Jul. 29, 2021

(65) Prior Publication Data
US 2023/0001797 A1    Jan. 5, 2023

(30) Foreign Application Priority Data
Jan. 20, 2020    (JP) .................. 2020-006560

(51) Int. Cl.
*B60L 3/00*    (2019.01)
*B60L 58/12*    (2019.01)
(Continued)

(52) U.S. Cl.
CPC ............. *B60L 3/0069* (2013.01); *B60L 58/12* (2019.02); *B60L 58/21* (2019.02); *H02H 3/16* (2013.01);
(Continued)

(58) Field of Classification Search
CPC ........ B60L 3/0069; B60L 58/12; B60L 58/21; B60L 2210/12; B60L 2210/10;
(Continued)

(56) References Cited

U.S. PATENT DOCUMENTS

2011/0156618 A1    6/2011  Seo et al.
2013/0099795 A1    4/2013  Kamata et al.
(Continued)

FOREIGN PATENT DOCUMENTS

JP    H08-320352 A    12/1996
JP    2004-248403 A    9/2004
(Continued)

OTHER PUBLICATIONS

PCT, International Search Report for the corresponding application No. PCT/JP2020/045459, dated Feb. 16, 2021, with English translation.
(Continued)

*Primary Examiner* — Jared Fureman
*Assistant Examiner* — Michael J Warmflash
(74) *Attorney, Agent, or Firm* — LUCAS & MERCANTI, LLP

(57) ABSTRACT

A vehicle power supply device converts power from high voltage to low voltage by selectively connecting a predetermined power storage element group to a low voltage electric load from a high voltage power supply formed by connecting power storage elements in series. A leakage current from the high voltage power supply is measured during the dead time period when the power storage element group is not connected to the low voltage electric load. When the value exceeds a predetermined value, the connection between the power storage element group and the low-voltage electric load is interrupted, so that electric shock is prevented.

15 Claims, 13 Drawing Sheets

(51) Int. Cl.
  *B60L 58/21*  (2019.01)
  *H02H 3/16*  (2006.01)
  *H02J 7/00*  (2006.01)

(52) U.S. Cl.
  CPC ......... *H02J 7/0024* (2013.01); *B60L 2210/12* (2013.01)

(58) Field of Classification Search
  CPC ......... B60L 3/0046; B60L 58/20; H02H 3/16; H02H 5/12; H02J 7/0024; H02J 7/0019
  See application file for complete search history.

(56)                References Cited

U.S. PATENT DOCUMENTS

| 2014/0301000 | A1  | 10/2014 | Takahashi et al. |
| 2023/0074268 | A1* | 3/2023  | Makio ................ B60L 58/20 |
| 2023/0101849 | A1* | 3/2023  | Makio ................ H02J 1/082 |
|              |     |         | 307/10.7 |

FOREIGN PATENT DOCUMENTS

| JP | 2013-257211 | A  | 12/2013 |
| JP | 2018-026973 | A  | 2/2018 |
| WO | 2015/110579 | A1 | 7/2015 |

OTHER PUBLICATIONS

European Patent Office, Extended European Search Report dated Feb. 12, 2024 for the related European patent application No. 20915202.4, 5 pages.

\* cited by examiner

POWER SUPPLY DEVICE FOR VEHICLE

CROSS REFERENCE TO RELATED APPLICATION

This Application is a 371 of PCT/JP2020/045459 filed on Dec. 7, 2020, which, in turn, claims priority of Japanese Patent Application No. 2020-006560 filed on Jan. 20, 2020, and the above applications are incorporated herein by reference.

TECHNICAL FIELD

The present invention relates to a power supply device mounted on a vehicle. The power supply device includes a high-voltage power storage means particularly used for vehicle traveling and the like, and a low-voltage power supply for supplying an electric load other than that for a vehicle traveling. The power supply device is configured to obtain the low voltage power supply from the high-voltage power storage means via a step-down means.

BACKGROUND ART

As the power supply device, a vehicle power supply device according to the proposal of the present applicant is known (Patent Publication (1)). In this vehicle power supply device, the high voltage power supply is formed by connecting power storage elements in series. The vehicle power supply device performs power conversion from a high voltage to a low voltage by selectively connecting a predetermined power storage element group to a low voltage electric load. The vehicle power supply device switches the power storage element group at high speed to make the switching loss of the switching means almost zero.

PRIOR ART PUBLICATION

Patent Publication

[Patent Publication (1)] Japanese Laid-Open Patent Publication No. 2018-26973

SUMMARY OF THE INVENTION

Problem(s) to be Solved by the Invention

There are various embodiments of the electric power storage means for driving the vehicle from a low voltage of about 48 V to a system using a high voltage of about 600 V. Generally, a vehicle using a voltage exceeding 60 V is provided with a configuration for preventing an electric shock accident. This prevents an electric shock accident when the human body touches the electric circuit portion connected to the power storage means of the vehicle.

Therefore, in a general high voltage system of a vehicle, a DC-DC converter provided with an isolation transformer is arranged between the high voltage part and the low voltage part as shown in FIG. 1. At the same time, the high voltage circuit floats both the negative potential circuit and the positive potential circuit while avoiding direct connection with the vehicle body. With this configuration, even if the human body touches any part of the circuit portion including the high voltage power storage means, no electric shock is caused.

Here, according to Patent Publication (1), the low potential side of the load means 50, which is a low voltage circuit, is generally connected to the vehicle body as a body ground of a 12V power supply. When any one or more of the switch means (30 to 35) is closed, any of the connection points of the power storage means (20*a* to 20L) connected in series on the high voltage side is directly connected to the vehicle body. Therefore, if the human body touches the high voltage circuit, an electric shock will occur. Specifically, it is assumed that the total series voltage of the power storage means (20*a* to 20L) is 480V. When the human body touches the positive potential side of the power storage means 20*a* and the vehicle body at the moment when the switch means 35 is closed, a high voltage of 480 V is applied to the human body. It is possible that an electric shock accident may occur.

The present invention has been made in view of the above problems. This can be applied to a case where a vehicle power supply device mounted on a vehicle and obtaining a low voltage power supply from a high voltage power supply via a step-down means is configured as a system having a voltage exceeding 60 V on the high voltage power supply side. 60V is the voltage of the electric shock limit of the human body. Even in this case, it is possible to prevent an electric shock accident without using an insulating means such as a transformer. Further, the present invention provides a power supply device for a vehicle that easily obtains a power conversion efficiency of about 100% in a power conversion function to the low voltage side.

Solution(s) to the Problem(s)

The present invention of Embodiment 1 is a power supply device for a vehicle, comprising: an electric load that operates at a predetermined low voltage; a high-voltage power supply that provides a high-voltage DC power supply by connecting in series a plurality of power storage elements constituting nodes that supply said predetermined low voltage; a high-voltage load device connected to the high-voltage power supply via a wire harness; a plurality of switch means provided corresponding to said nodes that supply the predetermined low voltage to the electric load; a control means wherein the control means supplies a voltage by turning on one of the switch means for supplying the voltage from at least one node and turning off the other switch means for supplying the voltage from the other nodes, and after setting a dead time period to turn off all the switch means once, by sequentially repeating turning on a next one of the switch means of a next node that supplies the voltage next and turning off the other switch means that supply the voltage from the other nodes so that the voltage is supplied from all the storage elements; a cutoff means for cutting off an electric circuit between the high-voltage power supply and the high-voltage load device; and a leakage detection means that detects a leakage current between the high-voltage power supply and a ground potential and sends a signal to said control means, wherein the control means determines the signal transmitted from the leakage detection means during the dead time period when the plurality of switching means are all off, and when the leakage current is equal to or higher than a predetermined current, the cutoff means are kept off for a predetermined period of time.

The present invention of Embodiment 2 is a power supply device for a vehicle,
wherein in said high-voltage power supply, (n (n: natural number)×N (N: natural number)) of said power storage elements constituting the nodes, in which n pieces of the nodes make up the predetermined low voltage, are connected in series, and a DC power source having a high voltage N times higher than the predetermined low voltage can be obtained.

The present invention of Embodiment 3 is a power supply device for a vehicle, wherein said control means controls the switch means so as to periodically change a plurality of selected nodes.

The present invention of Embodiment 4 is a power supply device for a vehicle, wherein said control means determines a node to be selected so that charge/discharge states of the plurality of power storage elements become substantially uniform.

The present invention of Embodiment 5 is a power supply device for a vehicle, wherein said control means determines a selective holding time of each node so that charge/discharge states of the plurality of power storage elements become substantially uniform.

The present invention of Embodiment 6 is a power supply device for a vehicle, wherein a time for connecting any of said nodes to said electric load by said switch means is set so that a time during which the leakage current flows from the high voltage power supply to a human body is less than a time during which an electric shock accident is caused in the human body.

The present invention of Embodiment 7 is a power supply device for a vehicle, wherein said time for connecting any of said nodes to said electric load by said switch means is set so as to be a time which is inversely proportional to a voltage value of the high voltage power supply, or a time which is inversely proportional to a current value detected by the leakage detecting means.

The present invention of Embodiment 8 is a power supply device for a vehicle, wherein said control means fixes the cutoff means to an off state when a leakage detection value of said leakage detection means is equal to or higher than a predetermined current value.

The present invention of Embodiment 9 is a power supply device for a vehicle, wherein when a leakage detection value of the leakage detection means is equal to or higher than a predetermined current value, said control means holds a state in which the cutoff means are off for a predetermined time and subsequently repeats an operation in which the cutoff means are on.

The present invention of Embodiment 10 is a power supply device for a vehicle, wherein said control means controls said switching means so that a product of a period in which each node and the electric load are connected and a leakage detection value of the leakage detection means is 0.003 amperes×1 second or less.

The present invention of Embodiment 11 is a power supply device for a vehicle, wherein said control means sets a cycle for switching a node selected by said switching means to be a predetermined value or less so that a magnitude of a charge/discharge depth in each node of the power storage element is equal to or less than a predetermined value.

The present invention of Embodiment 12 is a power supply device for a vehicle, wherein a capacitor is connected in parallel with the electric load.

The present invention of Embodiment 13 is a power supply device for a vehicle, wherein said dead time period or a capacitance value of the capacitor is set so that a voltage drop width applied to the electric load during the dead time period is not more than a predetermined value.

The present invention of Embodiment 14 is a power supply device for a vehicle, wherein the capacitor is arranged in parallel with each node of said power storage element.

The present invention of Embodiment 15 is a power supply device for a vehicle, wherein from each node of the high-voltage power source that provides said high-voltage DC power supply by connecting in series said power storage elements, an AC power is supplied to the electric load by alternately reversing a polarity with a high potential side and a low potential side at predetermined periods when the electric load is connected by the switching means.

Effect(s) of the Invention

The vehicle power supply device of Embodiment 1, Embodiment 2, assuming that the voltage of the low voltage power supply is [VL], the voltage [VH] of the high voltage power supply to which the power storage elements are connected in series is VL×N (N is a natural number). Moreover, since the number of the power storage elements is N×n (n is a natural number), for example, when [VL] is 12V and N=40, [VH] is 480V. Assuming that n=4, a high voltage power supply is composed of a total of N×n=160 power storage elements in series. The voltage of each power storage element is 3V.

Effect(s) of the Invention

The vehicle power supply device described in claim 1, Claim2, assuming that the voltage of the low voltage power supply is [VL], the voltage [VH] of the high voltage power supply to which the power storage elements are connected in series is VL×N (N is a natural number). Moreover, since the number of the power storage elements is N×n (n is a natural number), for example, when [VL] is 12V and N=40, [VH] is 480V. Assuming that n=4, a high voltage power supply is composed of a total of N× n=160 power storage elements in series. The voltage of each power storage element is 3V.

Therefore, in order to obtain a low voltage power supply of 12V, four power storage elements connected in series may be selected in a group manner and connected to an electric load.

However, in order to obtain a 12V low voltage power supply from a 480V high voltage power supply, it is not necessary to use a DC-DC converter using a known switching power supply circuit or the like. Step-down can be realized by a simple switching means that selectively connects to an electric load from each node (group node) of the power storage element connected in series.

Therefore, the configuration of the switching means can be simplified. Since the known switching loss and the loss generated from the inductor can be significantly reduced, the power loss for step-down can be reduced and the heat dissipation structure can be simplified. As a result, the weight and cost of the power supply device including the device for such step-down can be reduced.

Here, a part of the nodes of the power storage element connected in series of the high voltage power supply is connected to the low voltage circuit, that is, the metal part of the vehicle body via the switching means. When a human touches the high voltage power supply circuit part, an electric shock current flows through the human body.

However, the control means detects the current flowing from the high voltage power supply through the human body as the measured current value of the leakage detection means during the dead time period when all the switching means are turned off. When the value is equal to or higher than a predetermined value, the cutoff means for disconnecting the electric circuit connected to the high voltage load device from the vehicle power supply device via the wire harness connected to the outside is held in the off state, an electric shock accident can be prevented.

The vehicle power supply device of Embodiment 2, in the high voltage power supply, a plurality of power storage elements constituting a node having a predetermined low voltage with n (n: natural number) are connected in series (n×N (N: natural number)). A DC power supply having a high voltage N times a predetermined low voltage is obtained. Therefore, it is possible to efficiently supply a high voltage and a predetermined low voltage by using all the power storage elements.

The vehicle power supply device of Embodiment 3, the control means periodically changes the node selected by the switching means from the plurality of power storage elements. Among the power storage elements connected in series, it is possible to prevent a problem that only a part of the power storage elements is discharged and the other power storage elements are overcharged.

The vehicle power supply device of Embodiment 4, the control means determines the node to be selected so that the charge/discharge of the plurality of power storage elements are substantially uniform. It also has a known cell balance function required when charging and discharging a plurality of power storage elements in series.

The vehicle power supply device of Embodiment 5, the control means determines the selective holding time of each node so that the charge/discharge states of the plurality of power storage elements become substantially uniform. The selective holding time of each node is determined so that the charge/discharge state of the plurality of power storage elements becomes substantially uniform and the discharge time is long for the node selected from the power storage elements having a large charge amount. On the contrary, the selective holding time of each node is determined so that the discharge time is short for the node selected from the power storage elements having a small charge amount. It also has a known cell balance function required when charging and discharging a plurality of power storage elements in series.

It is said that when a high voltage is applied to the human body, there is no effect on the human body if the current value is 5 mA or less. It is known that in a current range larger than this, the human body reaction changes depending on the duration. As the current value increases, the human body is damaged by electric shock in a short time.

Therefore, in the earth-leakage circuit breaker used for a general commercial power supply, the earth-leakage detection sensitivity of 30 mA×0.1 sec is set.

The vehicle power supply device of Embodiment 6, the control means sets the period for connecting each node to the low-voltage electric load by the switching means to be less than the time during which an electric shock accident occurs in the human body. This period is the duration of the leakage current flowing from the high voltage power supply to the human body. Even when a person touches a circuit part of a high voltage power supply, it is possible to eliminate the damage to the human body.

The vehicle power supply device of Embodiment 7, the control means is set so that the period for connecting each node and the electric load by the switching means is a duration inversely proportional to the voltage value of the high voltage power supply. Alternatively, the duration is set to be inversely proportional to the leakage current value to the human body. When the voltage value of the high voltage power supply or the leakage current value to the human body is high and the electric shock current of the human body is large, the energization time to the human body, that is, the electric shock time can be shortened, so that the safety is further improved.

The vehicle power supply device of Embodiment 8, the control means fixes the cutoff means to the OFF state when the leakage detection value of the leakage detection means is equal to or higher than a predetermined current value. When a leakage from a high voltage power supply is detected, the high voltage power supply continues to float from the vehicle body, so that safety is further improved.

The vehicle power supply device of Embodiment 9, the control means holds a state in which the cutoff means are OFF for a predetermined time such as 0.5 seconds when the leakage detection value of the leakage detection means is equal to or higher than a predetermined current value. After that, the cutoff means repeats the operation of turning ON. Ensure safety by giving a sufficient pause time to the electric shock current to the human body. Even if a temporary leakage current occurs due to a failure of each part of the power supply device of the vehicle body, the power supply from the high voltage power supply to the high voltage load device is resumed, so that the vehicle function can be maintained.

The vehicle power supply device of Embodiment 10, the control means controls the switching means so that the product of the period for connecting each node and the electric load and the leakage detection value of the leakage detection means is 0.003 amperes x 1 second or less. It is possible to secure the same level of safety as the standard 0.03 amps x 0.1 seconds or less of the earth-leakage circuit breaker used in general commercial power supplies.

The vehicle power supply device of Embodiment 11, the control means sets a cycle for switching the node selected by the switching means so that the magnitude of the charge/discharge depth at each node of the power storage element is equal to or less than a predetermined value. It is possible to minimize the decrease in the life of each power storage element due to the charging/discharging depth of each power storage element being too large.

The vehicle power supply device of Embodiment 12, the control means powers the switching means from the capacitor during a so-called dead time period that disconnects the connection between all the nodes and the electrical load. As a result, it is possible to prevent the voltage supplied to the electric load from dropping. The voltage supplied to the electric load can be kept stable.

The vehicle power supply device of Embodiment 13, since the voltage applied to the electric load before and after the switching means is switched can be maintained, the potential difference between both ends of the switching means immediately before the switching means is turned on can be eliminated, and the switching loss can be eliminated.

Next, if the internal resistance of the power storage element is large immediately after the switching means switches the connection to an arbitrary node, it takes a lot of time to charge the capacitor connected in parallel with the electric load. Therefore, it is inevitable that the voltage supplied to the electric load will drop at the timing when the switching means is switched.

The vehicle power supply device of Embodiment 14, a capacitor with a small internal impedance is placed in parallel with the series node of the power storage element. Immediately after the switching means switches the connection to any node, the capacitor can be charged with a sufficiently small power supply impedance, that is, a large current. It is possible to suppress a decrease in the voltage supplied to the electric load.

The vehicle power supply device of Embodiment 15, power is supplied from each node of a high voltage power supply that obtains a high-voltage DC power supply by connecting a plurality of power storage elements in series. The polarities of the high-potential side and the low-potential side when connected to the electric load by the switching means are alternately reversed at predetermined intervals. AC power is supplied to the electric load. AC power can be supplied from the vehicle for the use of household appliances that require commercial power.

MODE TO CARRY OUT THE INVENTION

Embodiment

Figure 1:
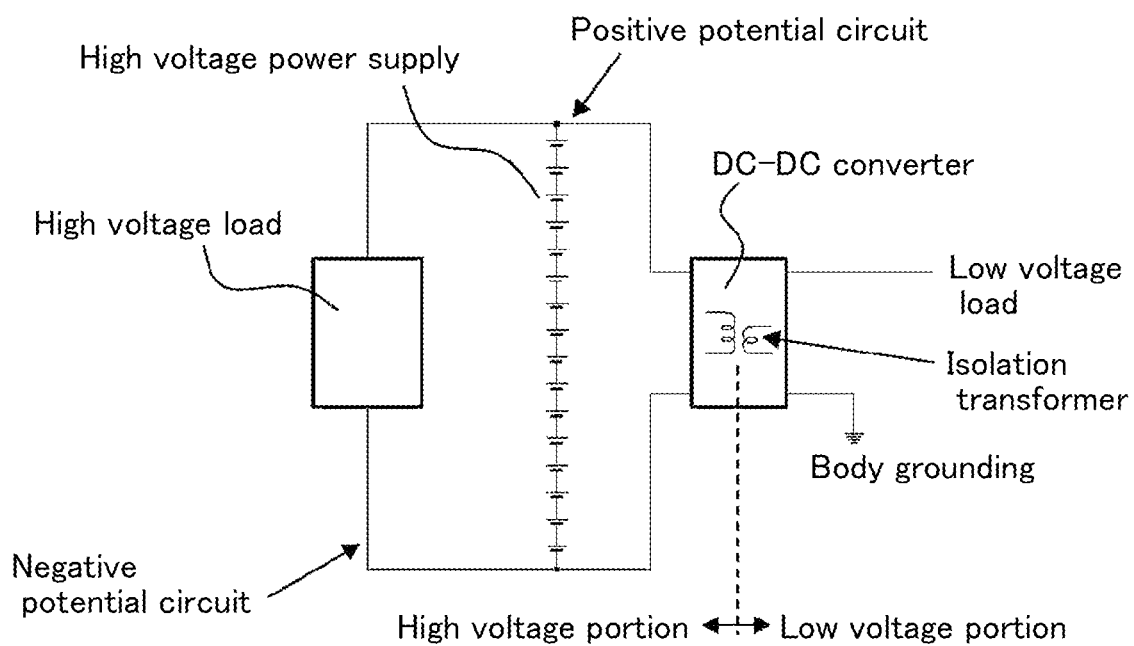
FIG. 1 a diagram showing a basic configuration of a general vehicle power supply device.
Figure 2:
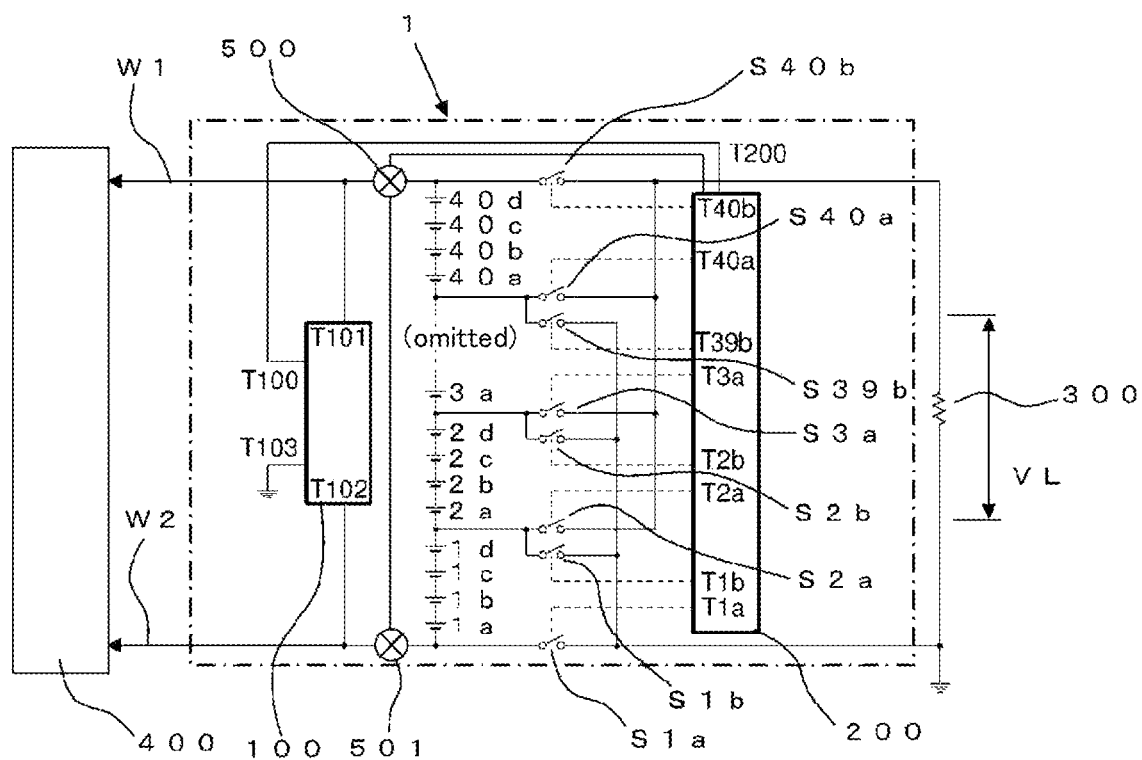
FIG. 2 a diagram showing a basic configuration of a vehicle power supply device according to an embodiment of the present invention.

Hereinafter, embodiments of the vehicle power supply device of the present invention will be described with reference to Figs. FIG. 2 is a basic embodiment of the present invention. A vehicle power supply device 1 includes power storage elements (1a to 40d) constituting a secondary battery charged by a power generation means (not shown) mechanically connected to a drive mechanism mounted on the vehicle and traveling by an engine and a motor. The vehicle power supply device 1 includes switching means (S1a to S40b), control means 200, leakage detection means 100, and cutoff means 500, 501. The vehicle power supply device is connected to electric load 300 which is operated by 12V, and one end on the negative potential side is electrically connected to the vehicle body. The vehicle power supply device 1 is connected to the high voltage load device 400 via the wire harnesses W1 and W2, and supplies the electric power of the high voltage power storage elements 1a to 40d to the high voltage load device 400.

In FIG. 2, the power storage elements (3b to 39d), the switching means (S3b to S39a) connected to the power storage elements, and the parts where the switching means and the control means 200 are connected are omitted.

The power generation means is driven by an engine (not shown) in order to supply the electric power required for the vehicle electrical components. The power generation means is configured to regenerate the kinetic energy at the time of deceleration via the drive mechanism at the time of deceleration of the vehicle and charge the power storage element (1a to 40d).

Each node of the power storage element (1a to 40d) is, for example, a lithium ion battery having a charging voltage of 3V. All the nodes of the power storage element (1a to 40d) are connected in series. A high voltage power supply with a total of 480 V is formed, where 40 is a multiple N with respect to the required voltage of 12 V of the electric load 300. The high voltage power supply powers the electric drive control system. The electric drive control system is composed of an in-vehicle motor, an inverter (not shown), etc. The high voltage power supply acts to assist the driving torque of the engine. As a result, when the vehicle is power running, the energy regenerated during deceleration can be reused for traveling, so that it is possible to improve the traveling fuel efficiency of the vehicle.

In the power storage elements (1a to 40d), the nodes 1a to 1d are configured as the first group node, the nodes 2a to 2d are configured as the second group node, and the nodes 3a to 3d are configured as the third group node. Then, the nodes 40a to 40d are configured as the 40th group node. Switching means S1a to S40b are connected to both ends of each group node.

The total number of nodes of the power storage elements (1a to 40d) is N×n=160 in total by multiplying the multiple N=40 by the number n=4 in each group node. In the claims, group nodes may simply be referred to as nodes.

Here, the total voltage of the power storage elements in series in each of the first to 40th group nodes is 3V×4=12V.

As shown in FIG. 2, the control means 200 controls the ON/OFF state of the switching means (S1a to S40b) and the ON/OFF state of the cutoff means 500, 501.

Figure 3:
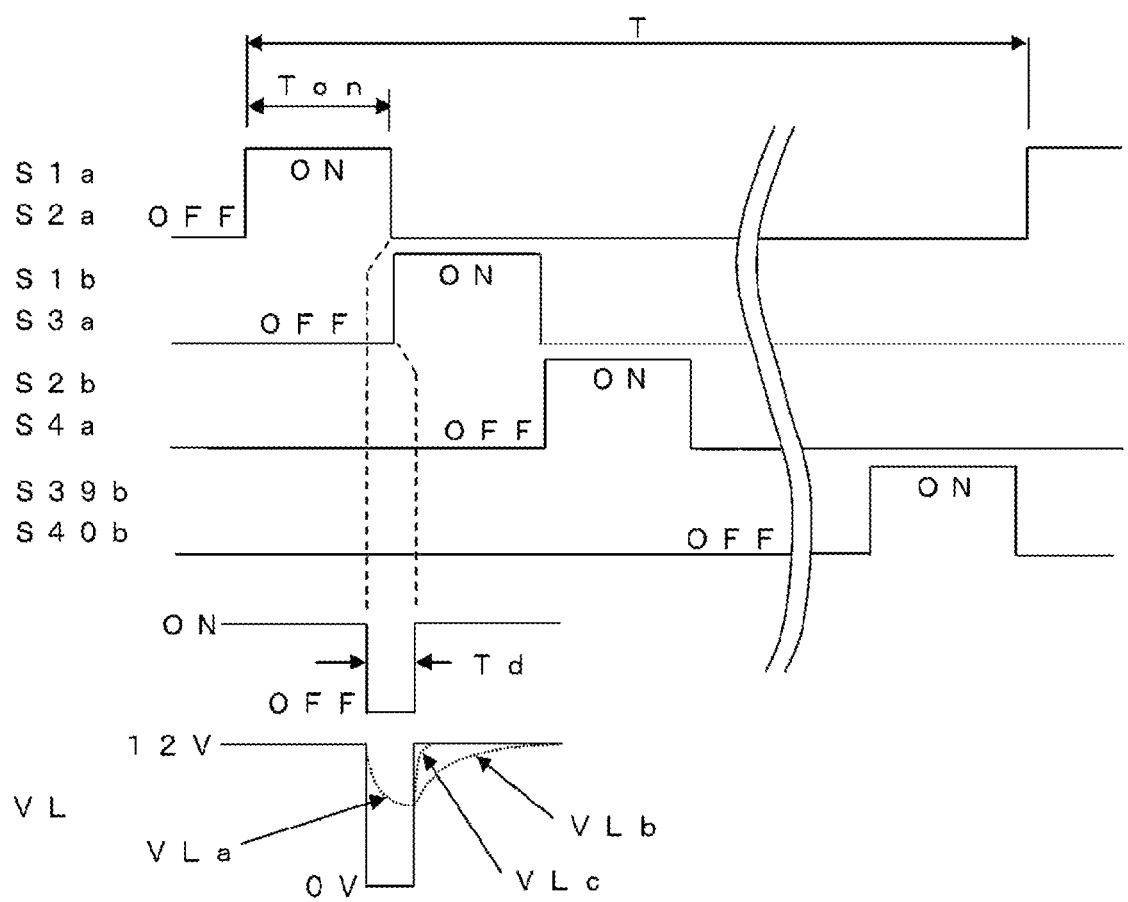
FIG. 3 a timing chart showing the basic operation of the vehicle power supply device according to the embodiment of the present invention.

As shown in FIG. 3, the control means 200 turns on the switching means (S1a, S2a) and connects the electric load 300 and the first group node of the power storage element for [Ton] time. At this time, the switching means other than the switching means (S1a, S2a) are turned off. The switching means S2a is connected to the positive electrode side of the first group node, and the switching means S1a is connected to the negative electrode side of the first group node. Therefore, a DC voltage of 12 V is applied to the electric load 300 for [Ton] time.

Next, the control means 200 keeps all the above-mentioned switching means (S1a to S40b) OFF during the period [Td] shown in FIG. 3. The reason why the period [Td] is provided is that, for example, when the switching means S1a and the switching means S1b are turned on at the same time, an excessive current flows in the closed circuit. The closed circuit is formed by the switching means S1a, the switching means S1b, and the nodes (1a, 1b, 1c, 1d) of the power storage element. This is because the switching means may be damaged or the charging power of each power storage element may be wasted.

It is assumed that, for example, a known MOSFET is adopted as the switching means (S1a to S40b). It is known that when a signal for controlling ON/OFF of each switching means is transmitted from the control means 200, a time delay occurs until the switching means (S1a to S40b) actually respond. Therefore, the control means 200 requires a sufficient waiting time [Td] from turning off the desired switching means to turning on the other switching means. This [Td] is called dead time. In the case of a general MOSFET, the dead time needs to be several tens of nsec to several nsec.

As described above, the control means 200 turns on the switching means (S1a, S2a) for the first group node of the power storage element during [Ton], and connects the first group node to the electric load 300. As a result, the required voltage of 12V is supplied to the electric load 300. Subsequently, for the second group node, the second group node is connected to the electric load 300 during [Ton] via the switching means (S1b, S3a). For the third group node, the third group node is connected to the electrical load 300 during [Ton] via the switching means (S2b, S4a). Finally, for the 40th group node, the 40th group node is connected to the electrical load 300 during [Ton] via the switching means (S39b, S40b). In this way, [T] shown in FIG. 3 is repeated as one cycle, and the supply of 12 V DC power to the electric load 300 is continued. The charge/discharge state of each of the first to 40th power storage element group nodes can be kept substantially uniform.

Next, FIGS. 2 and 4 will be referred to, and the operation of the leakage detecting means 100 will be explained.

The leakage detecting means 100 is connected to both ends of the power storage element (1a to 40d) via the terminal T102 and the terminal T101, and is grounded to the vehicle body via the terminal T103. Here, the earth leakage detecting means compares the current flowing between the terminal T101 and the grounding terminal T103 with the current flowing between the terminal T102 and the grounding terminal T103. The earth leakage detecting means is configured to output the larger current as an earth leakage detecting value from the terminal T100 to the control means 200.

During the period when all of the switching means (S1a to S40b) are OFF, the terminal T101 and the terminal T102 are floating with respect to the vehicle body, so the leakage detection value is OA. However, when the human body touches the positive electrode side of the power storage element 40d, that is, the T101 side, a leakage current is detected between the terminal T102 and the ground terminal T103. This is because the resistance value of the human body is about 5 KΩ.

Figure 4:
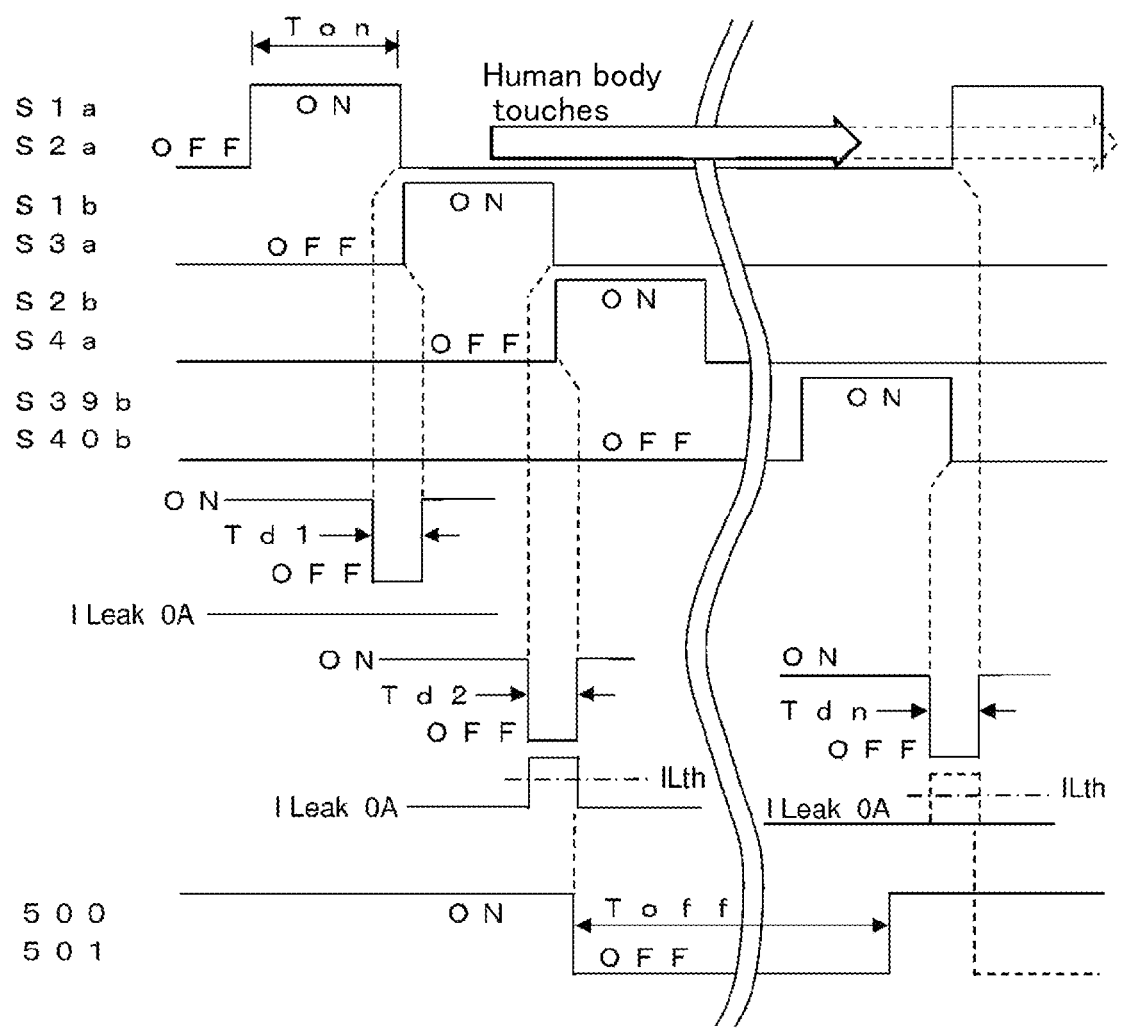
FIG. 4 a diagram illustrating leakage detection of a vehicle power supply device according to the embodiment of the present invention.

Therefore, as shown in FIG. 4, the leakage detection means 100 has a leakage detection value [ILeak] of OA in the dead time period [Td1]. In the dead time period [Td1], the switching means S1a and S2a are turned off, and all the switching means including the switching means S1a and S2a are turned off. However, in the dead time period [Td2], the leakage detection value [ILeak] in the leakage detection means 100 becomes larger than OA. In the dead time period [Td2], when the human body touches the high voltage portion while the switching means S1b and S3a are ON, all the switching means including the switching means S1b and S3a are turned OFF.

The control means 200 inputs the leakage detection value [ILeak] to the terminal T200 of the control means 200 via the terminal T100 of the leakage detection means 100. When the control means 200 detects that the [ILeak] is equal to or higher than the predetermined value [ILth], the control means 200 turns off the cutoff means 500 and the cutoff means 501 during the [Toff] period, as shown in FIG. 4, The time [Toff] is set to infinity, and after that, the cutoff means 500, 501 may remain off.

Alternatively, as shown in FIG. 4, the [Toff] is set to, for example, about 0.5 seconds, and the cutoff means 500 and 501 may be turned on again.

If the leakage detection value [ILeek] of the leakage detection means 100 in the dead time period [Tdn] exceeds [ILth] when the cutoff means 500 and 501 are turned on again, it is determined that the human body is still in contact with the high voltage circuit. Then, as shown by the broken line showing the action of the cutoff means 500 and 501 in FIG. 4, the cutoff means 500 and 501 are turned off again to repeat on and off When the cutoff means 500 and 501 are turned on again, if the leakage detection value [ILeek] of the leakage detection means 100 in the dead time period [Tdn] is less than [ILth], it is determined that the human body is not in contact with the high voltage circuit. As shown by the solid line showing the operation of the cutoff means 500 and 501 in FIG. 4, the cutoff means 500 and 501 hold the on state and restart the supply of electric power to the high voltage load device 400.

Since the high voltage power supply supplied to the outside from the power storage elements 1a to 40d is cut off by the cutoff means 500 and 501, the high voltage current does not flow through the human body and electric shock can be prevented. By surrounding the vehicle power supply device 1 with a housing (not shown), it is possible to prevent a human body from touching the inside of the vehicle power supply device 1 and receiving an electric shock.

Next, the power generation means (not shown) limits the charging voltage of the power storage element. The power generation means limits the charging voltage so that the voltage in which the entire node of the power storage element (1a to 40d) is connected in series becomes a predetermined maximum value.

On the other hand, the current consumption of the electric load 300 is not constant, and may change significantly in a short time depending on the operating state of the driver, for example, as in the case of electric power steering. In this case, if the switching means S1a to S40b are controlled by the control means 200 and the first group node to the 40th group node of the power storage element are switched at equal intervals, a difference may occur in the charging state of each group node.

Figure 5:
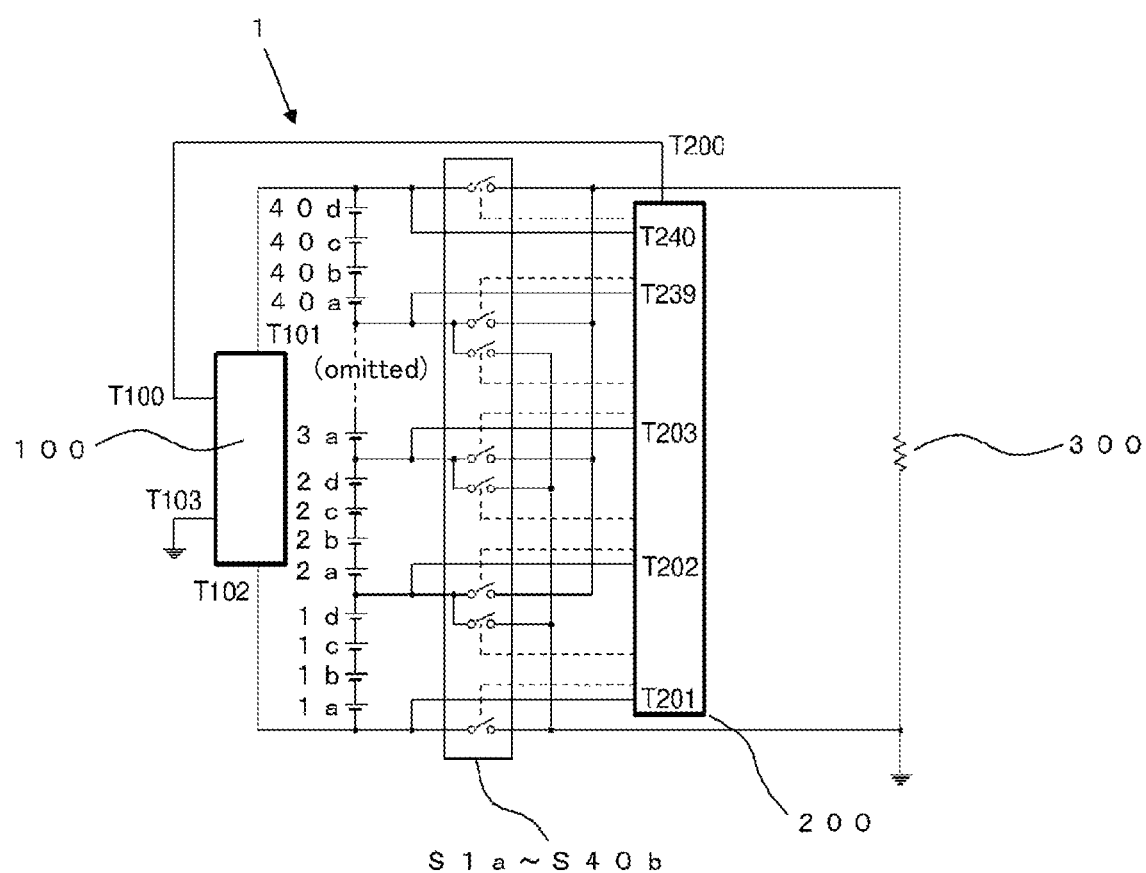
FIG. 5 a diagram showing a configuration for measuring the voltage of each node of the power storage element.

However, the control means 200 monitors the voltage of each group node of the power storage element via the terminals (T201, T202, T203 to T239, T240) shown in FIG. 5. The control means 200 preferentially connects the high voltage group node to the electric load 300. Then, the control means 200 prevents the low voltage group node from being connected to the electric load 300. The control means 200 selectively switches the storage element group (group node) to be discharged. As a result, the charging state of each power storage element group (group node) can be kept substantially uniform.

Figure 6:
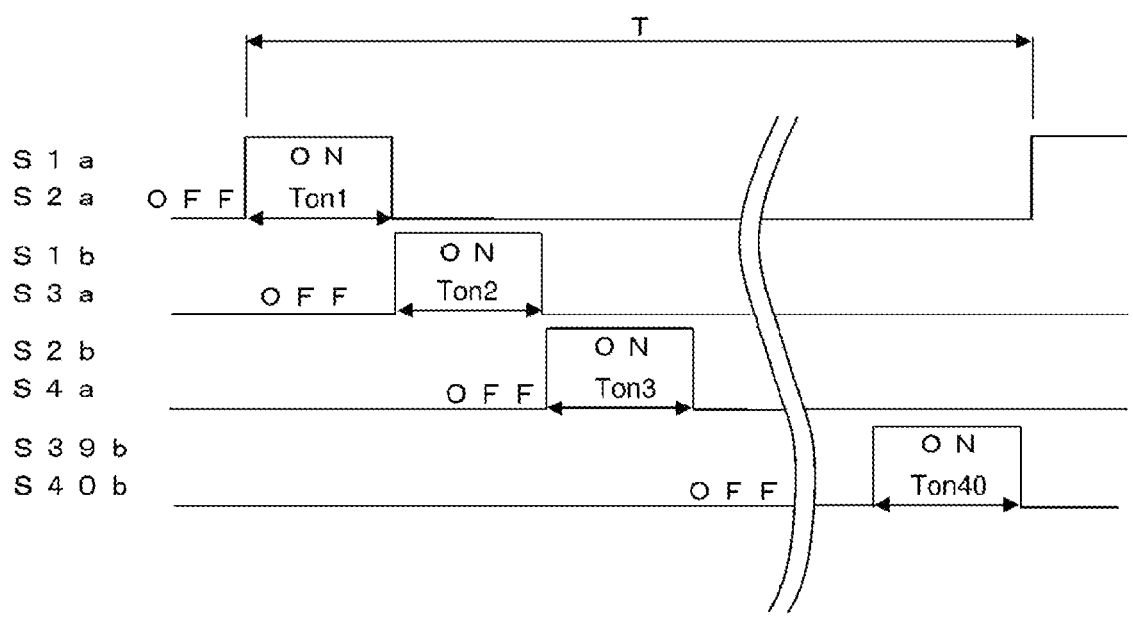
FIG. 6 a diagram showing the selective holding time of each node.

As another embodiment, as shown in FIG. 6, the control means 200 monitors the voltage of each group node of the power storage element via the terminals T (201, T202, T203 to T239, T240) shown in FIG. 5. The control means 200 sets a long period during which the switching means is ON for the high voltage group node. The control means 200 sets a short period during which the switching means is turned ON for the low voltage group node. In this way, (Ton1 to Ton40) can be individually calculated and controlled from the charge amount of the power storage element group (group node) and the current value flowing through the electric load 300. As a result, each power storage element group (group node) is maintained in a substantially uniform charging state.

As described above, as an action of the leakage detecting means 100, the presence or absence of electric shock due to the contact of the human body with the high voltage portion during the period [Ton] is detected. The period [Ton] is a period in which any two of the switching means S1a to S40b shown in FIG. 4 are ON. The detection is performed depending on whether or not the leakage detection value of the leakage detection means 100 in the dead time period [Td] at the moment when any of the two ON switching means is turned OFF is [ILth] or more and the cutoff means 500, 801 are turned OFF. Therefore, the maximum time for the electric shock current to actually flow to the human body is [Ton].

However, it is necessary that the electric shock current determined by the voltage value of the high voltage power supply by the power storage elements 1a to 40d and the resistance value of the human body and the human body reaction expected from the duration thereof are within the range that is harmless to the human body. The duration is determined by the [Ton] time. Generally, when the current value is 30 mA and the electric shock time is 0.1 sec or less, it is said that there is no fatal human reaction.

That is, it is said that the maximum value of the product of the electric shock current and the electric shock time is 0.003 amperes seconds in order to suppress the reaction to a safe human body.

Therefore, in this embodiment, it is assumed that the maximum electric shock current is 100 mA from the voltage value of the high voltage power supply of 480 V and the human body resistance of 5 KΩ. From this assumption, the electric shock time without harm to the human body is calculated to be 0.03 sec or less. Therefore, the maximum value of the period [Ton] during which any two of the switching means Sla to S40b are ON is set to 0.001 sec, which is a small value with sufficient margin.

In a system equipped with the vehicle's high voltage power supply, not only when the human body touches the high-voltage circuit part, but also a temporary leakage current may flow. The temporary leakage current is caused by a leak of a mounted electronic component, a malfunction of an insulating portion, vibration during traveling, or the like. In such a case, if the power supply from the high voltage power source to the high voltage load device 400 is completely stopped by the action of the control means 200, the function of each part may be lost while the vehicle is running, which may be dangerous.

Therefore, according to the embodiment, as mentioned above, in the control means 200, when the leakage detection value [ILeak] of the leakage detection means 100 is equal to or higher than the predetermined current value [ILth], the cutoff means 500, 501 are turned OFF. This state is maintained for 0.5 seconds or longer. After that, the cutoff means 500, 501 repeat the operation of turning ON.

As a result, even if a temporary leakage current occurs due to a failure of each part of the power supply device of the vehicle body, the power supply from the high voltage power supply to the high voltage load device 400 is resumed. The vehicle function can be restored, and driving safety can be maintained. Further, the state in which the cutoff means 500, 501 are OFF is set to 0.5 seconds or longer. As a result, the leakage current is not caused by the failure of the vehicle, and even when the electric shock of the human body is actually caused, the fatal effect on the human body can be eliminated.

Here, when the leakage detection value [ILeak] of the leakage detection means 100 is equal to or higher than the predetermined current value [ILth], the control means 200 keeps the cutoff means 500, 501 OFF for 0.5 seconds or longer. After that, the switching means repeats the operation of turning ON the cutoff means 500, 501. At this time, the energization time [Ton] after restarting the operation is shortened in inverse proportion to the voltage value of the high voltage power supply by the power storage elements 1a to 40d. Alternatively, it is desirable that the energization time [Ton] is shortened in inverse proportion to the leakage current value detected by the leakage detection means 100. As a result, if the leakage is not caused by the vehicle but is an electric shock of the human body, the higher the voltage of the high voltage power supply, the shorter the energization time to the human body. And/or, the larger the electric shock current of the human body, the shorter the energization time to the human body. It is more secure.

Next, in the vehicle power supply device 1 according to the embodiment of the present invention, the control means 200 switches the switching means (Sla to S40b) and switches each group node of the power storage element (1a to 40d). This switching cycle will be described with reference to FIG. 10.

It is assumed that the control means 200 switches each group node in the cycle [T] to supply a predetermined low voltage power supply to the electric load 300. Further, it is assumed that the power generation means (not shown) is constantly charging so that the total voltage of the power storage elements (1a to 40d) connected in series becomes a predetermined value.

Figure 10:
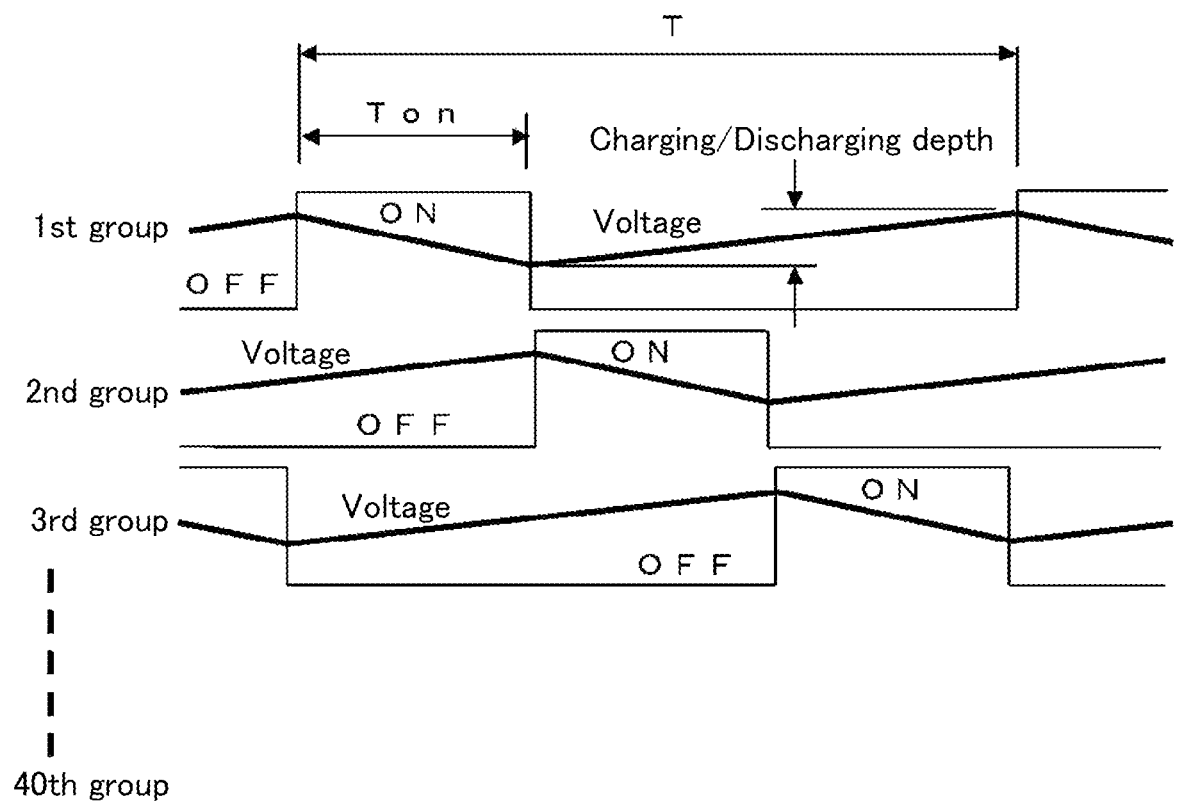
FIG. 10 a diagram illustrating the charge/discharge depth of the power storage element.

Here, as a group node of the power storage element selected by the control means 200, for example, the first group node shown in FIG. 10 can be given as an example. During the ON period of the first group node, the current flowing through the electric load 300 causes the first group node to be in a discharged state and the charging voltage drops. At the same time, since the charging current is supplied from the power generation means so that the total voltage of all the power storage elements 1a to 40d becomes constant, the voltage changes in the increasing direction in the group node not selected. The difference between the maximum voltage and the minimum voltage at the specific group node at this time is the so-called charge/discharge depth. As the width of the charge/discharge depth increases, the life of the power storage element decreases.

However, in order to suppress the human body reaction at the time of the above-mentioned human body electric shock, the time [Ton] is shortened. Similarly, from the viewpoint of the life of the power storage element, the time [Ton] in which the power storage element group (group node) is selectively connected to the electric load 300 by the control means 200 is shortened. At the same time, it can be seen that the control cycle [T] that goes around the selection of all the power storage element groups (group nodes) should be shortened.

Figure 8:
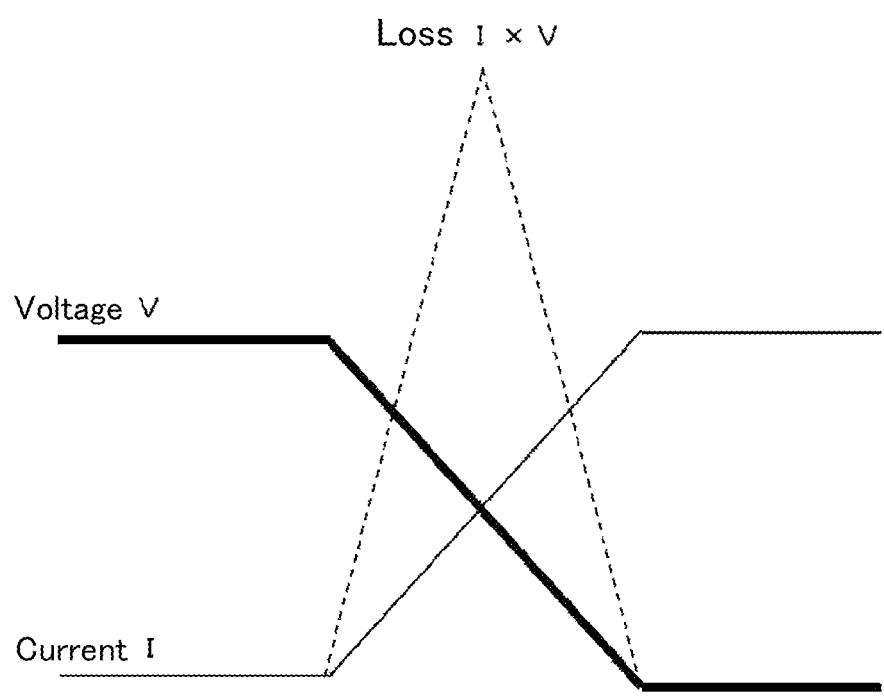
FIG. 8 a diagram illustrating power loss of a switching element.

However, as shown in FIG. 8, in the ON transition process of each switching means, the current [I] increases as the voltage [V] across the switching means decreases with the ON operation when the switching means is in the open state. At this time, in this embodiment, switching loss occurs in the switching means S1a to S40b. The loss I×V at this time when the switching means is in the open state is as follows. For example, if the voltage of each group node of the power storage element is 12V and the current of the electric load 300 is 200 A, a peak loss of 12×½×200×½=600 W occurs. Further, this switching loss also occurs in the OFF transition process of the switching means.

In addition, since the switching loss occurs during the dead time [Td], the average value of the switching loss with respect to the control cycle [T] of the control means 200 is [Td/T]. As described above, there is a problem that the switching loss becomes excessive by shortening the control cycle [T].

Further, according to the present embodiment, the voltage [VL] applied to the electric load 300 during the dead time [Td] period shown in FIG. 3 becomes 0V during the period when all the switching means (Sla to S40b) are OFF. Therefore, since the power supplied to the electric load 300 is momentarily interrupted, there is a problem that the low voltage vehicle electric load is momentarily stopped.

Figure 7:
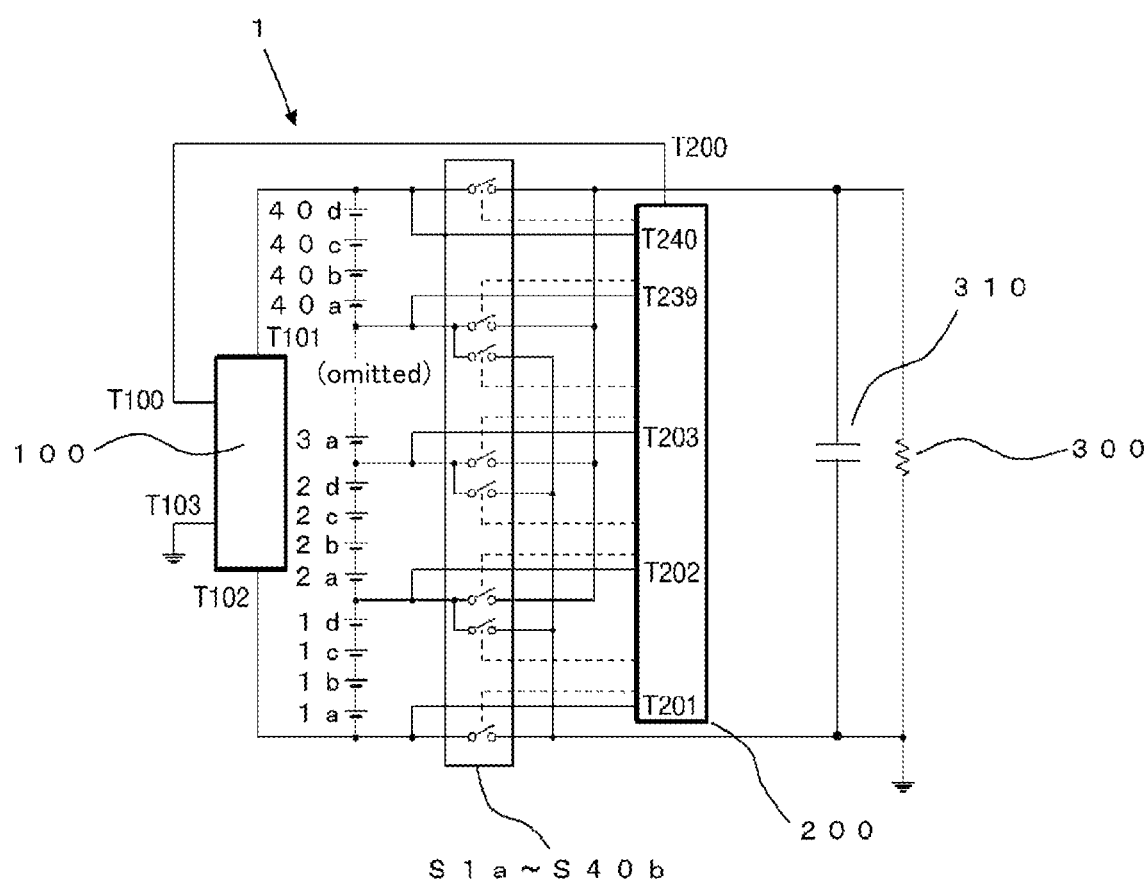
FIG. 7 a diagram showing an embodiment of a vehicle power supply device according to the embodiment of the present invention.

Therefore, as shown in FIG. 7, the capacitor 310 is arranged in parallel with the electric load 300. As a result, the voltage charged in the capacitor 310 continues to be supplied to the electric load 300. From this, the voltage [VL] does not drop to 0V, and can be limited to a slight voltage drop from the peak voltage as shown by the broken line [VLa] shown in FIG. 3. The amount of voltage drop in this case is determined by the current flowing through the electric load 300, the capacity of the capacitor 310, and the dead time [Td]. When the dead time [Td] and the current flowing through the electric load 300 are fixed, the larger the capacity of the capacitor 310, the smaller the amount of decrease in [VLa] can be.

The amount of drop in [VLa] is determined by the capacity of the capacitor 310, the dead time [Td], and the current value flowing through the electric load 300. Therefore, by adjusting the capacity of the capacitor 310 and shortening the dead time [Td], the amount of drop of the [VLa] can be reduced. Needless to say this.

Figure 9:
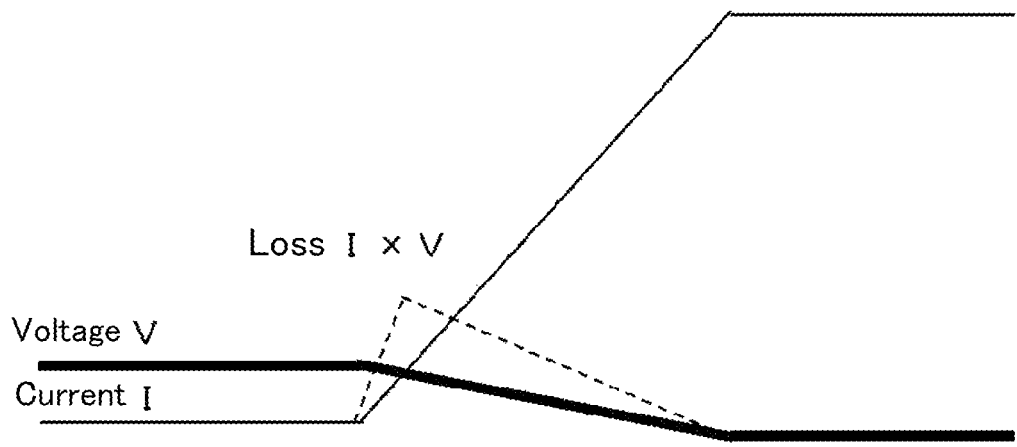
FIG. 9 a diagram illustrating power loss of a switching element.

Therefore, it is possible to prevent a momentary interruption of the voltage supplied to the electric load 300. Further, in the process in which any of the switching means (Sla to S40b) transitions to the ON state, the total voltage of the power storage elements connected in series is 12V, and the voltage of the capacitor 310 is approximately 12V. The total voltage of the power storage elements connected in series of 12V is a value at the group node of the power storage elements to which any switching means is turned ON and connected. From this, the voltage across the switching means can be set to approximately 0V when the switching means is in the open state. As shown in FIG. 9, the switching loss in this case is such that the loss I×V becomes the minimum because the current I increases while the voltage V remains approximately 0V.

In other words, the voltage of one group node of the power storage element is output as the voltage supplied to the electric load 300. It is utilized that the capacitor 310 holds the voltage of the group node. If the voltage of each group node is the same, the voltage of each group node when switching all the group nodes and the voltage of the electric load 300 (capacitor 310) are the same. The operation of the switching means is so-called [ZVS] (known zero volt switching), and theoretically no switching loss is generated.

According to this embodiment, since the switching loss is not generated at the time of stepping down from the high voltage power supply to the low voltage power supply, the heat loss generated by the switching element used for stepping down is extremely reduced. In the experiments of the inventors, when a step-down device having an output of 2.5 kW was manufactured, the power conversion efficiency was 99.5%. The heat sink is no longer required, which makes it possible to significantly reduce the system cost.

As described above, the control means 200 does not stop the power supply to the electric load 300 due to the detection of the leakage current caused by the vehicle. At the same time, in order to avoid danger due to an electric shock current to the human body, when the leakage detection value [ILeak] of the leakage detection means 100 is equal to or higher than the predetermined current value [ILth], the cutoff means 500, 501 are all held OFF state. For example, hold for 0.5 seconds (predetermined time) or more. After that, the switching means repeats the operation of turning ON the the cutoff means 500, 501 again.

In this case, the power supply from the high voltage power supply to the high voltage load device 400 is stopped for 0.5 seconds. It is preferable that the capacitor (not shown) has a sufficient capacitance is placed in parallel so that the specified voltage can be supplied from the capacitor to the high voltage load device 400 even during the stop period.

Figure 11:
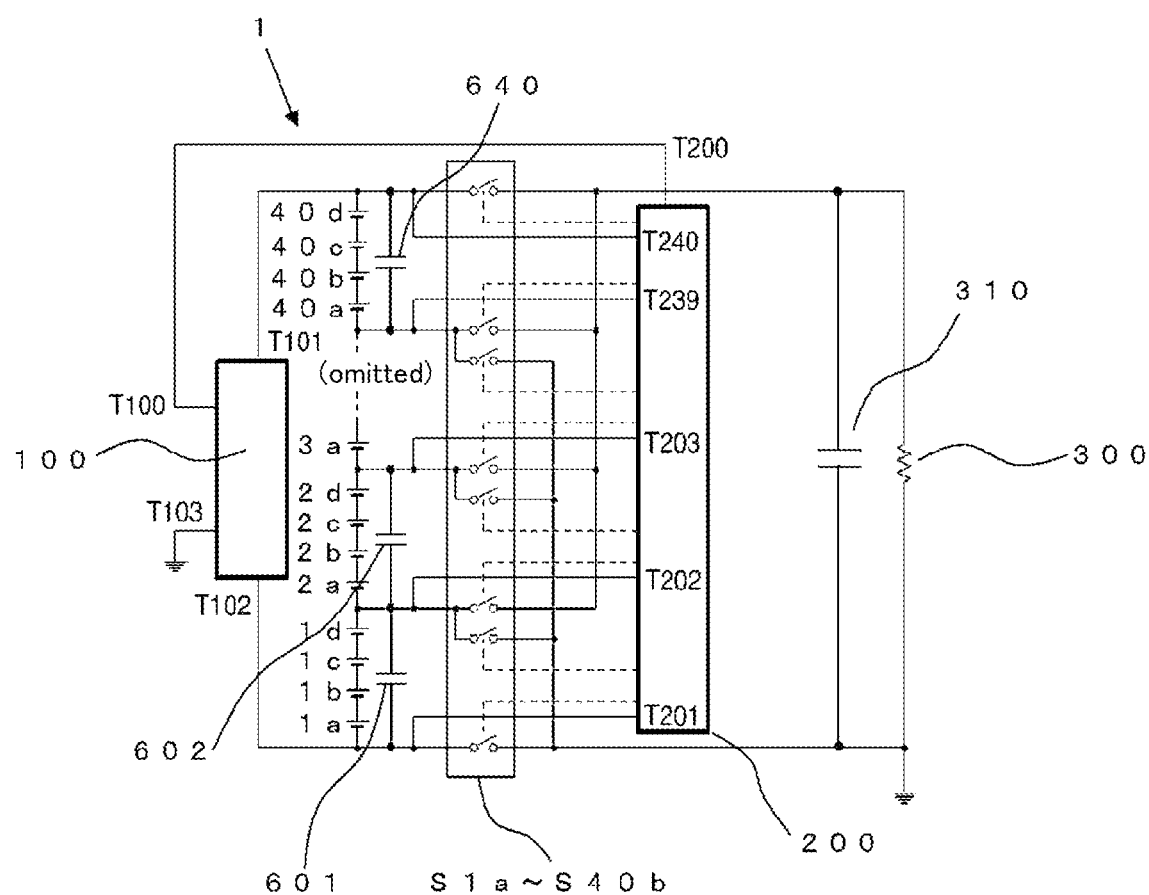
FIG. 11 a diagram showing another embodiment of the vehicle power supply device according to the embodiment of the present invention.

Next, as another embodiment, as shown in FIG. 11, capacitors (601, 602 to 640) are connected at both ends of each power storage element group (group node) formed by connecting four nodes in series among the power storage elements 1a to 40d.

It is known that the power storage element has an equivalent series resistance value of several tens of mΩ as an internal resistance (not shown) when, for example, a lithium ion battery is adopted. Therefore, in the case of four power storage elements connected in series in one group node in the present embodiment, each group node of the power storage element has an internal resistance of about 100 mΩ.

As shown in FIG. 3, the voltage [VL] of the electric load 300 rises when one of the switching means is turned ON after the dead time [Td] is terminated. At this time, the electric time constant of the rising portion is represented by the product of the capacitance of the capacitor 310 and the above-mentioned internal resistance. Therefore, when the capacitor 310 is charged by the internal resistance of the power storage element, the rising waveform [VLb] of [VL] has a large time constant and the low voltage state continues for a long time. Further, since this is repeated in the period [T], it becomes a factor that the average value of the voltage supplied to the electric load 300 decreases. It is desirable that the time constant be as small as possible.

Generally, the equivalent series resistance of a capacitor as a capacitance element is as small as several ma Therefore, if a capacitor (601, 602 to 640) is connected in parallel with each group node of the power storage element as in the present embodiment, the internal resistance of the power storage element is apparently reduced. As shown in FIG. 3, the rising waveform [VLc] of [VL] when the capacitor 310 is charged by the internal resistance has a small time constant and the low voltage state becomes short. Since this is repeated in the period [T], the decrease in the average value of the voltage supplied to the electric load 300 is small, and the accuracy of the voltage supplied to the electric load 300 is improved.

Figure 12:
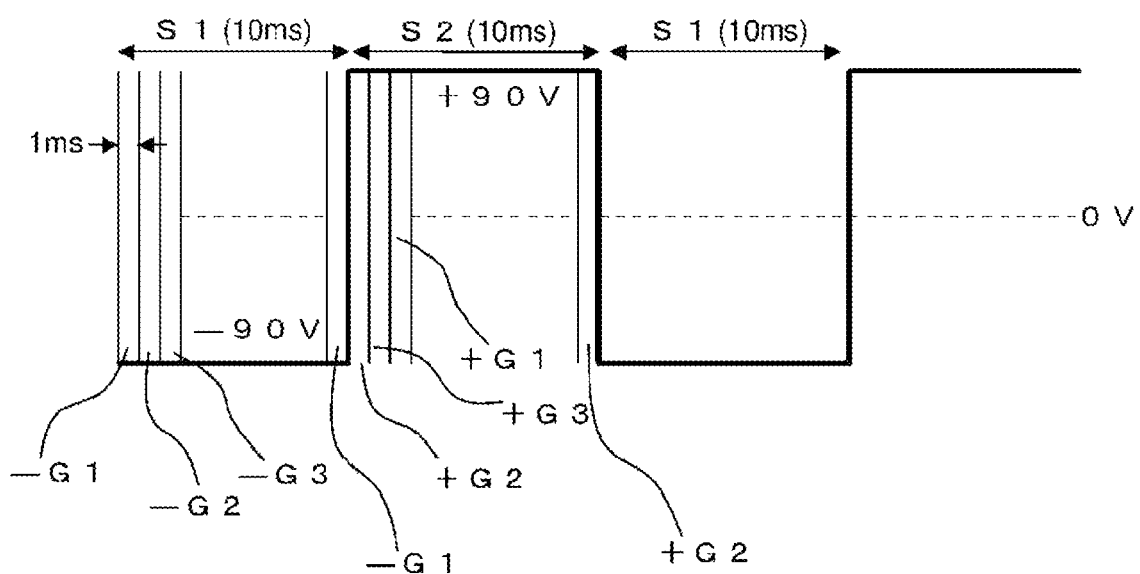
FIG. 12 a diagram illustrating a method of supplying AC power to an electric load.

Hereinafter, a method of outputting AC power for supplying to a device operated by a commercial power source from a plurality of power storage elements connected in series to form a high voltage power source will be described. FIG. 12 is referenced. Since the basic configuration is similar to the above-described embodiment, the figure showing the configuration in this embodiment is omitted.

First, as the power storage element, 180 lithium ion batteries having a cell voltage of 3V unit are connected in series, and the total voltage is set to 540V. Next, the 60 power storage elements are regarded as one group node, and the whole is divided into three group nodes (G1 to G3). The voltage of each group node is switched every 1 ms by the switching means and supplied to the commercial power supply load. When 10 ms has elapsed, the selected group node is G1. Next, when G2 is selected and supplied to the commercial power load, the switching means is operated to connect to the commercial power load. The polarity of the power storage element group (group node) is reversed. Subsequently, when switching between G3 and G1 while maintaining the same polarity, and finally when G3 is selected and connected in the next cycle in which G2 is selected, the power storage element group (group node) of which the polarity is reversed when connecting to the commercial power load again.

By repeating the above operation, a rectangular AC voltage of 50 Hz, ±90 V can be applied to the commercial power supply load.

As described above, in the vehicle power supply device according to the embodiment of the present invention, the high voltage power supply is formed by connecting power storage elements in series. By selectively connecting a predetermined power storage element group (group node) from the high voltage power source to a low voltage electric load, power conversion from high voltage to low voltage can be performed. At that time, by switching the power storage element group (group node) at high speed, the charge/discharge depth of the power storage element is reduced and the life is improved. At the same time, the switching loss of the switching means for switching can be made substantially zero. It has an excellent feature that the weight and cost of the member required for heat dissipation of the switching element can be significantly improved.

In addition, a dangerous human reaction can be suppressed even when the human body touches the high voltage power supply circuit portion without using means such as an isolated DC-DC converter.

Figure 13:
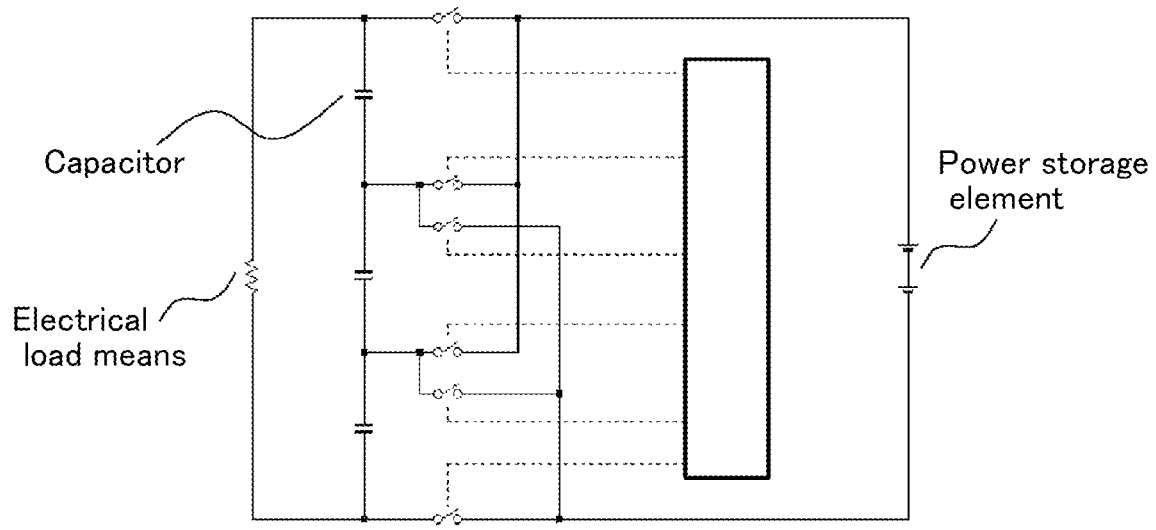
FIG. 13 a diagram showing a configuration to boost the voltage of the power storage element device according to the embodiment of the present invention.

As another embodiment, as shown in FIG. 13, by exchanging the power storage element and the electric load in the above-described embodiment, the voltage of the electric storage means can be boosted and supplied to the electric load. This is a matter that can be easily conceived by a person having ordinary knowledge in the technical field to which the present invention belongs. In the embodiment shown in FIG. 14, a capacitor constitutes a node and by charging each node with the voltage of the power storage element, it is configured to take out the boosted power from the capacitors connected in series.

INDUSTRIAL APPLICABILITY

In the embodiment of the present invention, only a limited configuration and operation are shown as examples. The number of power storage elements connected in series, the type of power storage element, the element type and configuration of the switching means, the type of the cutoff means, the number of the cutoff means, location of the cutoff means and the operation timing of the control means can take any form. At the same time, it should be easily understood that various known techniques exist as the configuration of the leakage detecting means, and that various failure detecting means and a fail-safe function at the time of failure may be added.

DESCRIPTION OF NUMERICAL REFERENCES

1*a* to 1*d* power storage element (node)
S1*a* to S40*b* switching means
100 Leakage detection means
200 control means
300 electrical load
400 high voltage load device
500, 501 cutoff means

The invention claimed is:

1. A power supply device for a vehicle, comprising:
an electric load that operates at a predetermined low voltage;
a high-voltage power supply that provides a high-voltage DC power supply by connecting in series a plurality of power storage elements constituting nodes that supply said predetermined low voltage;
a high-voltage load device connected to the high-voltage power supply via a wire harness;
a plurality of switch means provided corresponding to said nodes that supply the predetermined low voltage to the electric load;
a control means, wherein the control means supplies a voltage by turning on one of the switch means for supplying the voltage from at least one node and turning off the other switch means for supplying the voltage from the other nodes, and after setting a dead time period to turn off all the switch means once, by sequentially repeating turning on a next one of the switch means of a next node that supplies the voltage next and turning off the other switch means that supply the voltage from the other nodes so that the voltage is supplied from all the storage elements;
a cutoff means for cutting off an electric circuit between the high-voltage power supply and the high-voltage load device; and
a leakage detection means that detects a leakage current between the high-voltage power supply and a ground potential and sends a signal to said control means,
wherein the control means determines the signal transmitted from the leakage detection means during the dead time period when the plurality of switching means are all off, and when the leakage current is equal to or higher than a predetermined current, the cutoff means are kept off for a predetermined period of time.

2. The power supply device for the vehicle according to claim 1, wherein
in said high-voltage power supply, (n (n: natural number)×N (N: natural number)) of said power storage elements constituting the nodes, in which n pieces of the nodes make up the predetermined low voltage, are connected in series and a DC power source having a high voltage N times higher than the predetermined low voltage can be obtained.

3. The power supply device for the vehicle according to claim 1, wherein
said control means controls the switch means so as to periodically change a plurality of selected nodes.

4. The power supply device for the vehicle according to claim 3, wherein
said control means determines a node to be selected so that charge/discharge states of the plurality of power storage elements become substantially uniform.

5. The power supply device for the vehicle according to claim 3, wherein
said control means determines a selective holding time of each node so that charge/discharge states of the plurality of power storage elements become substantially uniform.

6. The power supply device for the vehicle according to claim 1, wherein a time for connecting any of said nodes to said electric load by said switch means is set so that a time during which the leakage current flows from the high voltage power supply to a human body is less than a time during which an electric shock accident is caused in the human body.

7. The power supply device for the vehicle according to claim 6, wherein
said time for connecting any of said nodes to said electric load by said switch means is set so as to be a time which is inversely proportional to a voltage value of the high voltage power supply, or a time which is inversely proportional to a current value detected by the leakage detecting means.

8. The power supply device for the vehicle according to claim 1, wherein said control means fixes the cutoff means to an off state when a leakage detection value of said leakage detection means is equal to or higher than a predetermined current value.

9. The power supply device for the vehicle according to claim 1, wherein
when a leakage detection value of the leakage detection means is equal to or higher than a predetermined current value, said control means holds a state in which the cutoff means are off for a predetermined time and subsequently repeats an operation in which the cutoff means are on.

10. The power supply device for the vehicle according to claim 1, wherein
said control means controls said switching means so that a product of a period in which each node and the electric load are connected and a leakage detection value of the leakage detection means is 0.003 amperes×1 second or less.

11. The power supply device for the vehicle according to claim 1, wherein
said control means sets a cycle for switching a node selected by said switching means to be a predetermined value or less so that a magnitude of a charge/discharge depth in each node of the power storage element is equal to or less than a predetermined value.

12. The power supply device for the vehicle according to claim 1, wherein
a capacitor is connected in parallel with the electric load.

13. The power supply device for the vehicle according to claim 12, wherein
said dead time period or a capacitance value of the capacitor is set so that a voltage drop width applied to the electric load during the dead time period is not more than a predetermined value.

14. The power supply device for the vehicle according to claim 12, wherein
the capacitor is arranged in parallel with each node of said power storage element.

15. The power supply device for the vehicle according to claim 1, wherein
from each node of the high-voltage power source that provides said high-voltage DC power supply by connecting in series said power storage elements, an AC power is supplied to the electric load by alternately reversing a polarity with a high potential side and a low potential side at predetermined periods when the electric load is connected by the switching means.

* * * * *